United States Patent
Cao et al.

(10) Patent No.: US 10,489,660 B2
(45) Date of Patent: Nov. 26, 2019

(54) VIDEO PROCESSING WITH OBJECT IDENTIFICATION

(71) Applicant: WIZR LLC, Santa Monica, CA (US)

(72) Inventors: Song Cao, Los Angeles, CA (US); Genquan Duan, Beijing (CN)

(73) Assignee: WIZR LLC, Santa Monica, CA (US)

( * ) Notice: Subject to any disclaimer, the term of this patent is extended or adjusted under 35 U.S.C. 154(b) by 0 days.

(21) Appl. No.: 15/413,329

(22) Filed: Jan. 23, 2017

(65) Prior Publication Data

US 2017/0213091 A1    Jul. 27, 2017

Related U.S. Application Data

(60) Provisional application No. 62/281,285, filed on Jan. 21, 2016.

(51) Int. Cl.
| | |
|---|---|
| *G06K 9/20* | (2006.01) |
| *G06K 9/34* | (2006.01) |
| *G06K 9/32* | (2006.01) |
| *G06K 9/00* | (2006.01) |

(52) U.S. Cl.
CPC ..... *G06K 9/00771* (2013.01); *G06K 9/00664* (2013.01); *G06K 9/2081* (2013.01); *G06K 9/3233* (2013.01); *G06K 9/342* (2013.01)

(58) Field of Classification Search
None
See application file for complete search history.

(56) References Cited

U.S. PATENT DOCUMENTS

| | | |
|---|---|---|
| 8,665,333 B1 | 3/2014 | Sharma et al. |
| 2004/0120581 A1 | 6/2004 | Ozer et al. |
| 2008/0170751 A1 | 7/2008 | Lei et al. |
| 2008/0263012 A1* | 10/2008 | Jones ............. G06F 17/30811 |
| 2009/0041297 A1 | 2/2009 | Zhang et al. |
| 2009/0231433 A1 | 9/2009 | Grigsby et al. |
| 2009/0307261 A1 | 12/2009 | Lindley et al. |
| 2013/0170760 A1* | 7/2013 | Wang ................. G06K 9/00771 |
| | | 382/224 |

(Continued)

OTHER PUBLICATIONS

International Search Report dated Sep. 27, 2017 as received in Application No. PCT/US2017/014629.

(Continued)

*Primary Examiner* — Idowu O Osifade
(74) *Attorney, Agent, or Firm* — Maschoff Brennan

(57) ABSTRACT

A computer-implemented method to identify an object in a video is disclosed. The method may include obtaining a video and receiving an indication of one or more foreground regions in the video from a user module based on a user selection within the user module. The method may also include receiving an indication of one or more regions of interest in the foreground regions from the user module based on a user selection within the user module. The method may include determining a human potential size in a plurality of locations in the one or more regions of interest. The method may include generating a background model based on a plurality of frames of the video. The method may also include tracking an object in the one or more regions of interest based on the background model. The method may include identifying the object as a predicted human based on the human potential size.

17 Claims, 4 Drawing Sheets

(56) References Cited

U.S. PATENT DOCUMENTS

2014/0333775 A1    11/2014    Naikal et al.

OTHER PUBLICATIONS

Written Opinion of the International Searching Authority dated Sep. 27, 2017 as received in Application No. PCT/US2017/014629.
Extended Search Report dated Jul. 10, 2019 as received in Application No. 15895256.4.
Kruegle, H., "Smart Camera" In: "CCTV Surveillance: Analog and Digital Video Practices and Technology," pp. 122-123, (Jan. 1, 2006).
European Partial Search Report dated Apr. 2, 2019 as received in Application No. 15895256.4.

* cited by examiner

VIDEO PROCESSING WITH OBJECT IDENTIFICATION

CROSS-REFERENCE TO A RELATED APPLICATION

This application claims the benefit of and priority to U.S. Provisional Application No. 62/281,285, filed on Jan. 21, 2016, titled "VIDEO PROCESSING," which is incorporated herein by reference in its entirety.

BACKGROUND

Modern video surveillance systems provide features to assist those who desire safety or security. One such feature is automated monitoring of the video created by surveillance cameras. A video surveillance system may include a video processor to detect when events occur in the videos created by a surveillance camera system.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to identify an object in a video is disclosed. The method may include obtaining a video and receiving an indication of one or more foreground regions in the video from a user module based on a user selection within the user module. The method may also include receiving an indication of one or more regions of interest in the foreground regions from the user module based on a user selection within the user module. The method may include determining a human potential size in a plurality of locations in the one or more regions of interest. The method may include generating a background model based on a plurality of frames of the video. The method may also include tracking an object in the one or more regions of interest based on the background model. The method may include identifying the object as a predicted human based on the human potential size.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Disclosure is read with reference to the accompanying drawings.

DISCLOSURE

Systems and methods are disclosed for a method of identifying an object in a video. Systems and methods are also disclosed for detecting a human in a video. Systems and methods are also disclosed for a multi-camera video tracking system.

Figure 1:
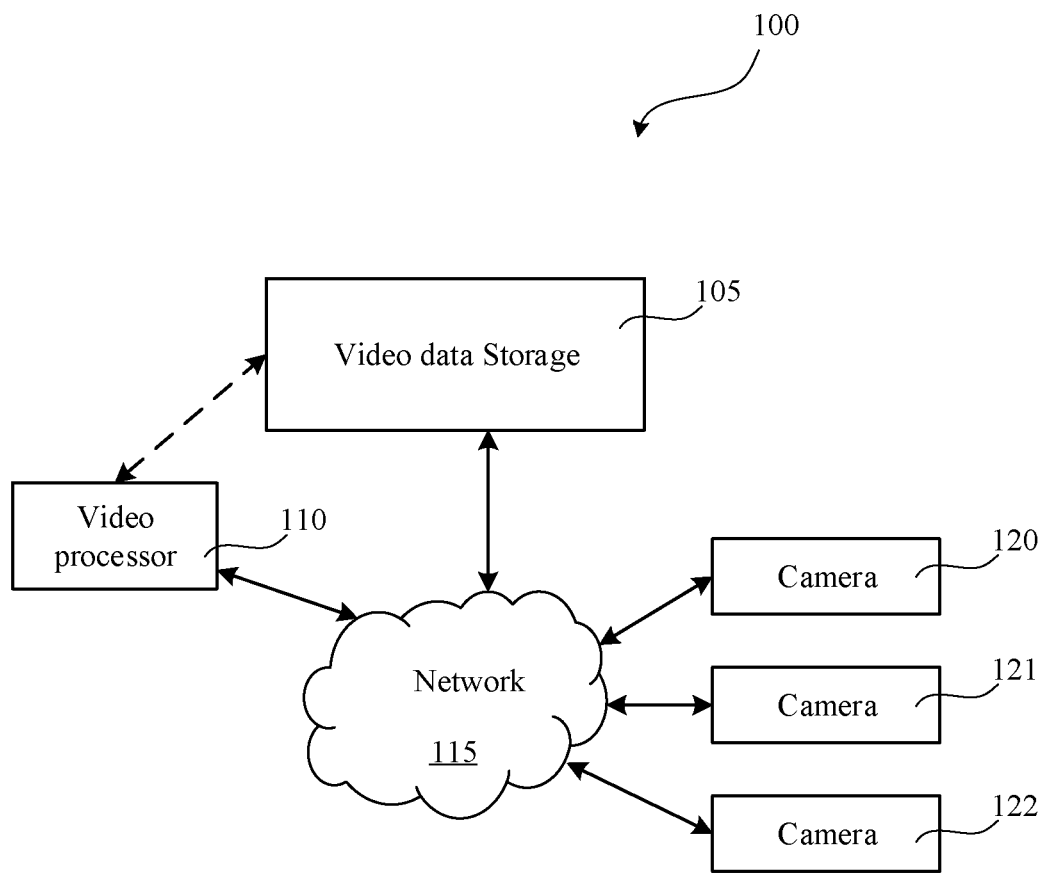
FIG. 1 illustrates a block diagram of a system 100 for a multi-camera video tracking system.

FIG. 1 illustrates a block diagram of a system 100 that may be used in various embodiments. The system 100 may include a plurality of cameras: camera 120, camera 121, and camera 122. While three cameras are shown, any number of cameras may be included. These cameras may include any type of video camera such as, for example, a wireless video camera, a black and white video camera, surveillance video camera, portable cameras, battery powered cameras, CCTV cameras, Wi-Fi enabled cameras, smartphones, smart devices, tablets, computers, GoPro cameras, wearable cameras, etc. The cameras may be positioned anywhere such as, for example, within the same geographic location, in separate geographic locations, positioned to record portions of the same scene, positioned to record different portions of the same scene, etc. In some embodiments, the cameras may be owned and/or operated by different users, organizations, companies, entities, etc.

The cameras may be coupled with the network 115. The network 115 may, for example, include the Internet, a telephonic network, a wireless telephone network, a 3G network, etc. In some embodiments, the network may include multiple networks, connections, servers, switches, routers, connections, etc., that may enable the transfer of data. In some embodiments, the network 115 may be or may include the Internet. In some embodiments, the network may include one or more LAN, WAN, WLAN, MAN, SAN, PAN, EPN, and/or VPN.

In some embodiments, one more of the cameras may be coupled with a base station, digital video recorder, or a controller that is then coupled with the network 115.

The system 100 may also include video data storage 105 and/or a video processor 110. In some embodiments, the video data storage 105 and the video processor 110 may be coupled together via a dedicated communication channel that is separate from or part of the network 115. In some embodiments, the video data storage 105 and the video processor 110 may share data via the network 115. In some embodiments, the video data storage 105 and the video processor 110 may be part of the same system or systems.

In some embodiments, the video data storage 105 may include one or more remote or local data storage locations such as, for example, a cloud storage location, a remote storage location, etc.

In some embodiments, the video data storage 105 may store video files recorded by one or more of camera 120, camera 121, and camera 122. In some embodiments, the video files may be stored in any video format such as, for example, mpeg, avi, etc. In some embodiments, video files from the cameras may be transferred to the video data storage 105 using any data transfer protocol such as, for example, HTTP live streaming (HLS), real time streaming protocol (RTSP), Real Time Messaging Protocol (RTMP), HTTP Dynamic Streaming (HDS), Smooth Streaming, Dynamic Streaming over HTTP, HTML5, Shoutcast, etc.

In some embodiments, the video data storage 105 may store user identified event data reported by one or more individuals. The user identified event data may be used, for example, to train the video processor 110 to capture feature events.

In some embodiments, a video file may be recorded and stored in memory located at a user location prior to being transmitted to the video data storage 105. In some embodiments, a video file may be recorded by the camera and streamed directly to the video data storage 105.

In some embodiments, the video processor 110 may include one or more local and/or remote servers that may be used to perform data processing on videos stored in the video data storage 105. In some embodiments, the video processor 110 may execute one or more algorithms on one or more video files stored within the video storage location. In some embodiments, the video processor 110 may execute a plurality of algorithms in parallel on a plurality of video files stored within the video data storage 105. In some embodiments, the video processor 110 may include a plurality of processors (or servers) that each execute one or more algorithms on one or more video files stored in video data storage 105. In some embodiments, the video processor 110 may include one or more of the components of computational system 300 shown in FIG. 3.

Figure 2:
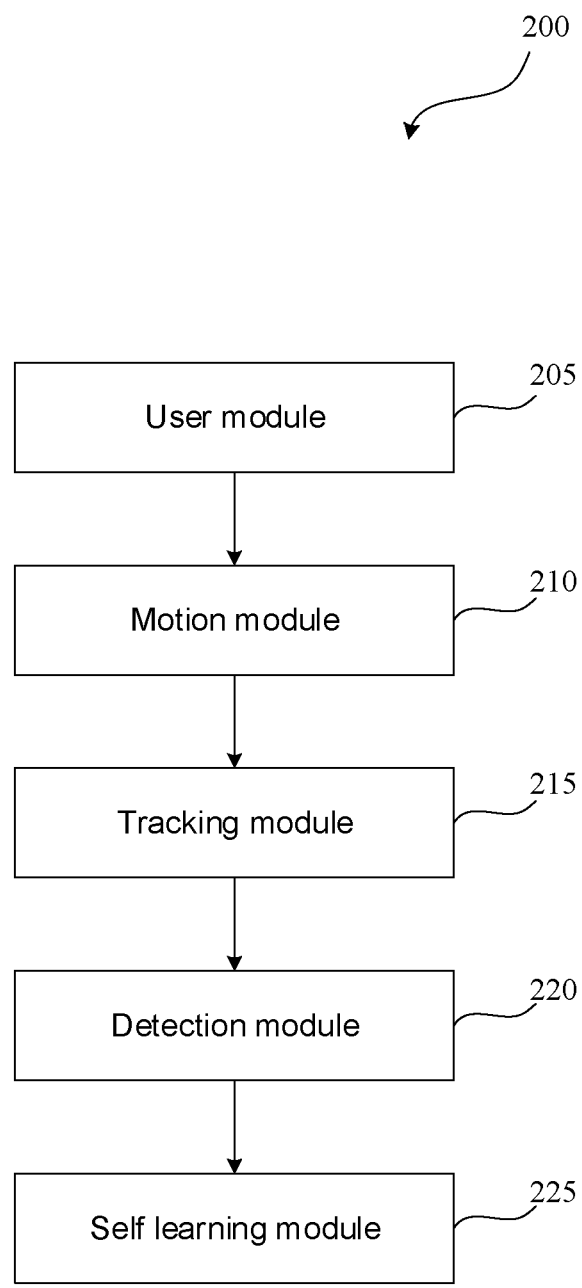
FIG. 2 is a flowchart of an example process for processing video according to some embodiments.

FIG. 2 is a flowchart of an example process 200 for processing videos according to some embodiments. One or more steps of the process 200 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

At block 205 in the user module a user may indicate foreground regions within the scene recorded in a video. In some embodiments, the user may indicate multiple regions within the scene that are considered foreground regions. In some embodiments, the user may do this graphically by drawing foreground areas within a scene. For example, a user may create a window by clicking or touching two areas within one or more frames on the video. The region of interest for a video frame may then be segmented into regions of interest using any process known in the art.

In some embodiments, an algorithm such as, for example, the grabcut algorithm may be used to segment the region of interest. For example, the algorithm may estimate the color distribution of the target object identified within the bounding box and/or that of the background using a Gaussian mixture model. The color distribution of the target object may then be used to construct a Markov random field over the pixel labels, with an energy function that prefers connected regions having the same label, and running a graph cut based optimization to infer their values. This process may be repeated a number of times until convergence. The result may provide a mask that blocks out the background.

In some embodiments, at block 205, human potential size may be determined by placing a graphical image of a human within the scene. The graphical image of the human may be scaled by the user until the human is approximately the size of a human recorded within the scene. Based on the amount of scaling, a typical human size may be determined. This may be repeated multiple times throughout the scene.

At block 210 a background model may be created from the first number of frames using the images mean and/or covariance. The background model may be created, for example, using a Gaussian Mixture Model (GMM). The input, for example, can be a single frame from the video. The output, for example, can be a motion probability and/or a motion mask.

The background model may be initialized as M. For each input frame, f, the difference between f and the background model M can be calculated. Three Gaussians, $g_1$, $g_2$, $g_3$, can be used to describe the three color channels of the input frame. Since each gaussian will output a probability, the probability of a mixture Gaussian is the sum of these three probabilities: $p(i, j)=g_1+g_2+g_3$, which can describe a region or pixel(i, j) as foreground or background. Each Gaussian may be described as $g(I, \mu, \sigma)$; where I represents the image, $\mu$ represents the mean, and $\sigma$ represents the covariance.

In some embodiments, the whole background model is an online updating model. The model can keep updating the background parameter to handle the change of viewpoint or illumination such as, for example, as the time of day changes and/or as the camera moves, pans, and/or tilts. In some embodiments, $\mu$ and $\sigma$ can be updated using a maximum likelihood algorithm such as, for example, an EM algorithm, when a new frame(s) is analyzed and/or added to the model.

In some embodiments, object tracking through the video frame can be performed by a tracking module at block 215. In some embodiments, five frames (or any number of frames) can be input into the tracking module and a predicted candidate region may be output. In some embodiments, the object tracking module can be used to determine, estimate, and/or predict regions in a frame representing a human (a candidate region).

In some embodiments, the detection area can be limited. Assuming we have the detection result for frame $f_i$, where $i=1, \ldots, 5$ as $r_{ij}$, the recent detection responses may be stored in a buffer. Each detection response may be represented as $r_{ij}=(x, y, w, h)$. If the detection result $r_{ij}$ and $r_{i,j}$ are similar, then there is a high probability that this is a region of interest. In some embodiments, an object detector may only be used in the predicted region.

At block 220 one or more humans may be detected in a video frame of the video. In some embodiments, a detection module may be used. In some embodiments, a frame may be input into the detection module with a region of interest defined. A detection response may be output. In some embodiments, the frame may be converted into a grayscale image. Associated Pairing Comparison Features (APCF) may be extracted from the grayscale image. The APCF may pare comparison of color and gradient orientation in granular space. The APCF feature may provide a chain of weak classifiers. Each classifier may provide a determination for the current extracted APCF feature such as, for example, the current region.

For example, when locating a human in a frame or image, APCF features in the whole image can be extracted. After this, a sliding window can scan the whole frame. Assume we already trained a detector M, in each sliding window, a chain of weak classifiers will be used to determine if this area is a human or not. In detail, each sliding window needs to pass every weak classifier in order to decide this is the human.

At block 225 false alarm events can be learned. In some embodiments, false alarm data may be input into a self-learning module. The false alarm data, for example, may be collected from user input regarding various inputs, videos, and/or features. For example, SURF feature (or any other feature detector) may be used to compute features of the candidate $a_i$. The feature may be computed to match with the candidate SURF features; for example, the test image can be compared with the false alarm image. If the matched points are over a threshold value, T, which indicates the new detection results are similar to the sample in our false alarm, then candidate $a_i$ can be labeled as a false alarm. In some embodiments, the threshold value, T, can be calculated by the ratio of matched points divided by the total points.

In some embodiments, video processing may be spread among a plurality of servers located in the cloud or on a cloud computing process. For example, different aspects, steps, or blocks of a video processing algorithm may occur on a different server. Alternatively or additionally, video processing for different videos may occur at different servers in the cloud.

In some embodiments, each video frame of a video may include metadata. For example, the video may be processed for event and/or object detection. If an event or an object occurs within the video then metadata associated with the video may include details about the object or the event. The metadata may be saved with the video or as a standalone file. The metadata, for example, may include the time, the number of people in the scene, the height of one or more persons, the weight of one or more persons, the number of cars in the scene, the color of one or more cars in the scene, the license plate of one or more cars in the scene, the identity of one or more persons in the scene, facial recognition data for one or more persons in the scene, object identifiers for various objects in the scene, the color of objects in the scene, the type of objects within the scene, the number of objects in the scene, the video quality, the lighting quality, the trajectory of an object in the scene, etc.

In some embodiments, feature detection may occur within a user specified region of interest. For example, a user may draw a bounding box in one or more frames of a scene recorded by a camera. The bounding box may define the region of interest within which events may be identified and/or tracked. In some embodiments, a user may specify two or more points within a frame and a polygonal shaped bounding box may be created based on these points. In some embodiments, the user may have the option to specify whether the bounding box bounds the region of interest or should be excluded from the region of interest.

Figure 3:
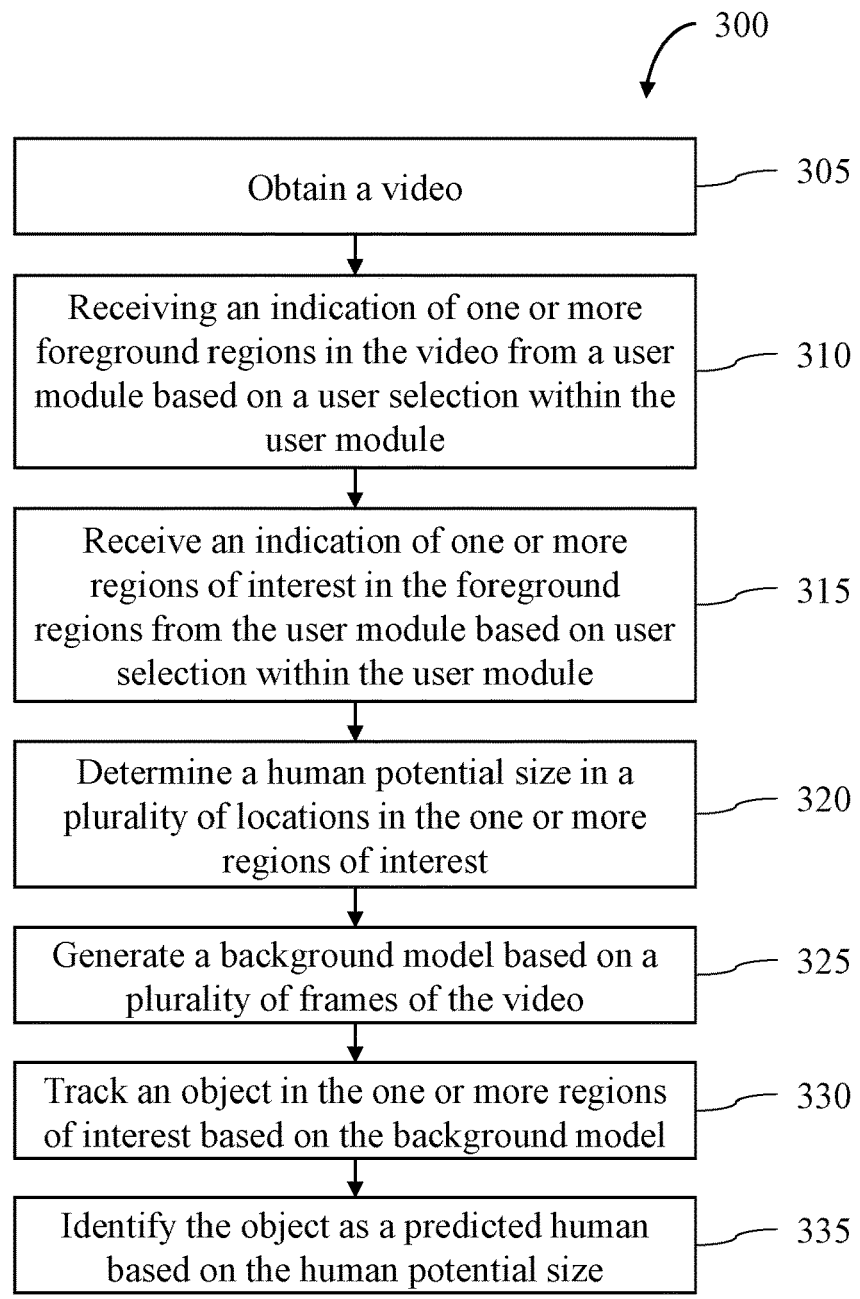
FIG. 3 is a flowchart of an example process for identifying an object in a video.

FIG. 3 is a flowchart of an example process 300 for identifying an object in a video according to some embodiments. One or more steps of the process 200 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

At block 305, a video processor may obtain a video. At block 310, an indication of one or more foreground regions in the video from a user module, such as the user module 205, based on a user selection within the user module may be received. In some embodiments, the user selection may be performed graphically drawing around a portion of one or more frames of the video. In some embodiments, the user selection may be performed by selecting two points in one or more frames of the video and drawing a window through the two points. In some embodiments, the user selection may be an area outside of the window through the two points.

At block 315, an indication of one or more regions of interest in the foreground regions from the user module based on a user selection within the user module may be received. In some embodiments, the user selection may be performed graphically drawing around a portion of one or more frames of the video. In some embodiments, the user selection may be performed by selecting two points in one or more frames of the video and drawing a window through the two points. In some embodiments, the user selection may be an area outside of the window through the two points.

At block 320, a human potential size in multiple locations in the one or more regions of interest may be determined. In some embodiments, determining a human potential size may include placing a graphical image of a human within the one or more regions of interest and scaling, by a user, the graphical image of a human to an approximate size of a human recorded in the one or more regions of interest.

At block 325, a background model based on multiple frames of the video may be generated. In some embodiments, the multiple frames of the video may include multiple first frames of the video. In some embodiments, the background model may be generated by using a Gaussian mixture model. In some embodiments, the background model may include an online updating model that may update in correspondence with a changing viewpoint of the video and a changing illumination of the video. In these and other embodiments, the video may be a video from a camera and the changing viewpoint of the video may include a camera move, a camera pan, and a camera tilt.

At block 330, an object in the one or more regions of interest may be tracked based on the background model. At block 335, the object may be identified as a predicted human based on the human potential size.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
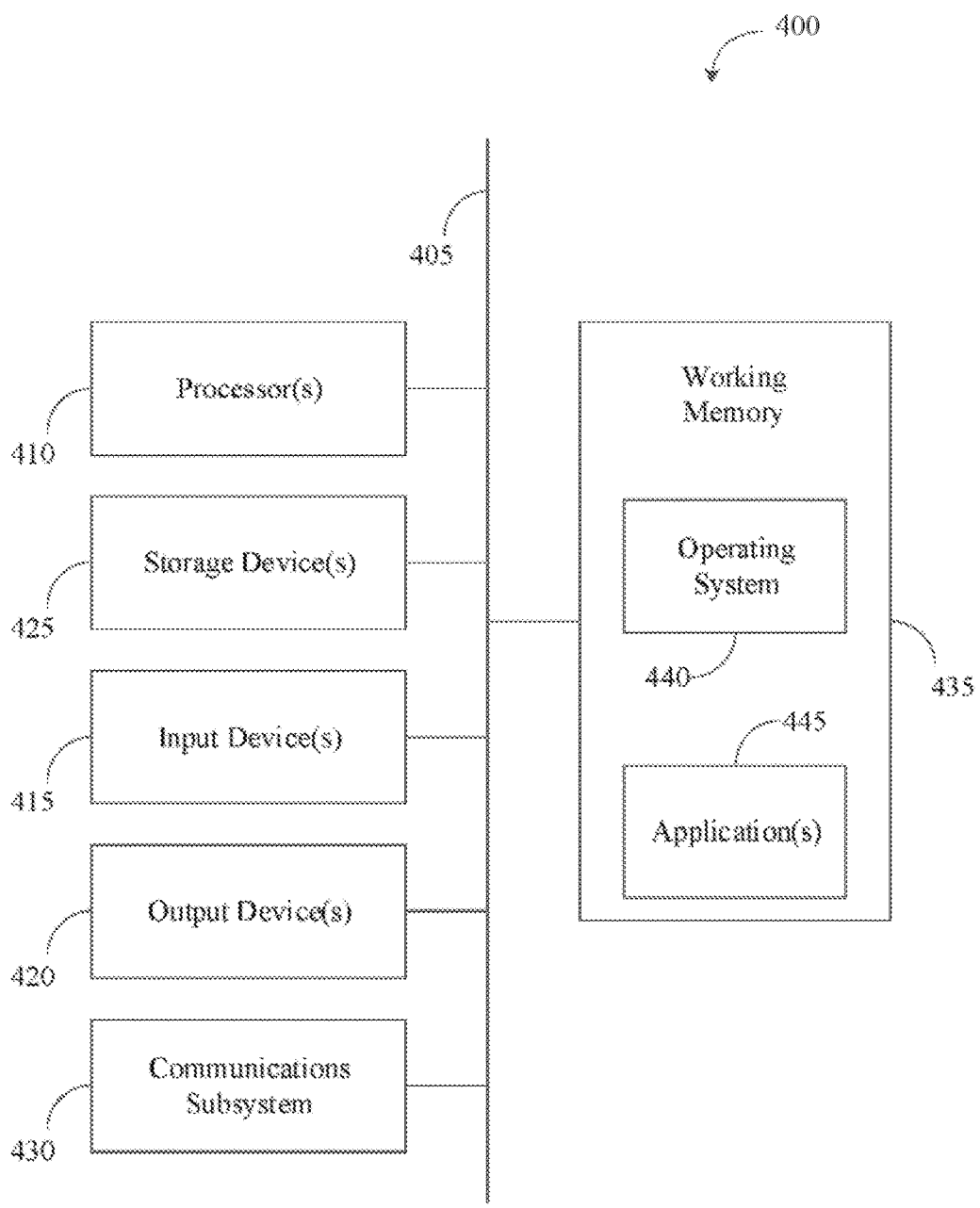
FIG. 4 shows an illustrative computational system for performing functionality to facilitate implementation of embodiments described herein.

The computational system 400 (or processing unit) illustrated in FIG. 4 can be used to perform and/or control operation of any of the embodiments described herein. For example, the computational system 400 can be used alone or in conjunction with other components. As another example, the computational system 400 can be used to perform any calculation, solve any equation, perform any identification, and/or make any determination described here.

The computational system 400 may include any or all of the hardware elements shown in the figure and described herein. The computational system 400 may include hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard, and/or the like; and one or more output devices 420, which can include, without limitation, a display device, a printer, and/or the like.

The computational system 400 may further include (and/or be in communication with) one or more storage devices 425, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 400 might also include a communications subsystem 430, which can include, without limitation, a modem, a network card (wireless or wired), an infrared communication device, a wireless communication device, and/or chipset (such as a Bluetooth® device, an 802.6 device, a Wi-Fi device, a WiMAX device, cellular communication facilities, etc.), and/or the like. The communications subsystem 430 may permit data to be exchanged with a network (such as the network described below, to name one example) and/or any other devices described herein. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from the computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code.

The term "substantially" means within 3% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A computer-implemented method to identify an object in a video, the method comprising:
    obtaining a video;
    receiving an indication of one or more foreground regions in the video from a user module based on a user selection within the user module;
    receiving an indication of one or more regions of interest in the foreground regions from the user module based on a user selection within the user module;
    displaying a graphical image of a human within the one or more regions of interest;
    receiving a scaling of the graphical image of the human by a user to an approximate size of a human which would be recorded in the one or more regions of interest;

determining a human potential size in a plurality of locations in the one or more regions of interest based on the received scaling of the graphical image by the user;
generating a background model based on a plurality of frames of the video;
tracking an object in the one or more regions of interest based on the background model; and
identifying the object as a predicted human based on the human potential size.

2. The method of claim 1, wherein the user selection is performed graphically by drawing around a portion of one or more frames of the video.

3. The method of claim 1, wherein the user selection is performed by selecting two points in one or more frames of the video and drawing a window through the two points.

4. The method of claim 3, wherein the user selection is an area outside of the window through the two points.

5. The method of claim 1, wherein the plurality of frames of the video comprises a plurality of first frames of the video.

6. The method of claim 1, wherein the generating the background model includes generating the background model by using a Gaussian mixture model.

7. The method of claim 1, wherein the background model comprises an online updating model and updates in correspondence with a changing viewpoint of the video and a changing illumination of the video.

8. The method of claim 7, wherein the video is a video from a camera and wherein the changing viewpoint of the video comprises a camera move, a camera pan, or a camera tilt.

9. At least one non-transitory computer readable media configured to store one or more instructions that in response to being executed by at least one computing system, cause the at least one computing system to perform the method of claim 1.

10. A computer-implemented method to identify an object in a video, the method comprising:
obtaining a video;
receiving an indication of one or more foreground regions in the video from a user module based on a user selection within the user module;
displaying a graphical image of a human within the one or more regions of interest;
receiving a scaling of the graphical image of the human by a user to an approximate size of a human which would be recorded in the one or more regions of interest;
determining a human potential size in a plurality of locations in the one or more regions of interest based on the received scaling of the graphical image by the user;
tracking an object in the one or more foreground regions; and
identifying the object as a predicted human based on the human potential size.

11. The method of claim 10, wherein the user selection is performed graphically by drawing around a portion of one or more frames of the video.

12. The method of claim 10, wherein the user selection is performed by selecting two points in one or more frames of the video and drawing a window through the two points.

13. The method of claim 12, wherein the user selection is an area outside of the window through the two points.

14. At least one non-transitory computer readable media configured to store one or more instructions that in response to being executed by at least one computing system, cause the at least one computing system to perform the method of claim 10.

15. A system for filtering events, the system comprising:
a network;
an image of a human; and
a video processor configured to:
obtain a video;
receiving an indication of one or more foreground regions in the video from a user module based on a user selection within the user module;
display a graphical image of a human within the one or more regions of interest;
receive a scaling of the graphical image of the human by a user to an approximate size of a human which would be recorded in the one or more regions of interest;
determine a human potential size in multiple locations in the one or more foreground regions based on the received scaling of the graphical image by the user;
track an object in the one or more foreground regions; and
identify the object as a predicted human based on the human potential size.

16. The system of claim 15, wherein the user selection is performed graphically by drawing around a portion of one or more frames of the video.

17. The method of claim 15, wherein the user selection is performed by selecting two points in one or more frames of the video and drawing a window through the two points.

* * * * *